US012762068B2

(12) United States Patent
Kim

(10) Patent No.: US 12,762,068 B2
(45) **Date of Patent: *Oct. 13, 2026**

(54) MEMORY CONTROLLER FOR RPMB-INCLUSIVE MEMORY DEVICE, OPERATING METHOD THEREOF AND ELECTRONIC DEVICE INCLUDING THE SAME

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/266,176

(22) Filed: Jul. 11, 2025

(65) Prior Publication Data

US 2025/0342125 A1 Nov. 6, 2025

Related U.S. Application Data

(63) Continuation of application No. 18/587,293, filed on Feb. 26, 2024, now Pat. No. 12,393,522, which is a continuation of application No. 18/083,572, filed on Dec. 19, 2022, now Pat. No. 11,914,526, which is a continuation of application No. 16/889,377, filed on (Continued)

(30) Foreign Application Priority Data

Jan. 31, 2018 (KR) ........................ 10-2018-0012287

(51) Int. Cl.

| | |
|---|---|
| ***G06F 12/14*** | (2006.01) |
| ***G06F 21/79*** | (2013.01) |
| ***G11C 7/24*** | (2006.01) |
| ***G11C 16/22*** | (2006.01) |
| *G06F 12/02* | (2006.01) |

(52) U.S. Cl.

CPC .......... *G06F 12/14* (2013.01); *G06F 12/1458* (2013.01); *G06F 21/79* (2013.01); *G11C 7/24* (2013.01); *G11C 16/22* (2013.01); *G06F 12/0246* (2013.01); *G06F 12/1433* (2013.01); *G06F 2206/1014* (2013.01); *G06F 2212/1052* (2013.01)

(58) Field of Classification Search

CPC ...... G06F 12/14; G06F 12/1458; G06F 21/79; G06F 12/0246; G06F 12/1433; G06F 2206/1014; G06F 2212/1052; G06F 21/78; G06F 3/0659; G06F 3/0611; G06F 3/062; G06F 3/064; G06F 3/0658; G06F 3/0679; G11C 7/24; G11C 16/22; G11C 7/1063

USPC .................................................. 711/163, 154

See application file for complete search history.

(56) References Cited

U.S. PATENT DOCUMENTS

2015/0286585 A1* 10/2015 Caraccio ............. G06F 12/1458 713/189
2016/0034683 A1* 2/2016 Lee ....................... G06F 9/4408 726/17

* cited by examiner

*Primary Examiner* — Hosain T Alam
*Assistant Examiner* — Zubair Ahmed
(74) *Attorney, Agent, or Firm* — IP&T GROUP LLP

(57) ABSTRACT

Provided herein may be a storage device and a method of operating the same. The method of operating a storage device including a replay protected memory block (RPMB) may include receiving a write request for the RPMB from an external host, selectively storing data in the RPMB based on an authentication operation, receiving a read request from the external host, and providing result data to the external host in response to the read request, wherein the read request includes a message indicating that a read command to be subsequently received from the external host is a command related to the result data.

12 Claims, 13 Drawing Sheets

Related U.S. Application Data

Jun. 1, 2020, now Pat. No. 11,580,033, which is a continuation of application No. 16/114,688, filed on Aug. 28, 2018, now Pat. No. 10,671,544.

FIG. 4

| Start | Stuff Bytes | Key/ (MAC) | Data | Nonce | Write Counter | Address | Block Count | Result | Req/ Resp | CRC16 | End |
|---|---|---|---|---|---|---|---|---|---|---|---|
| 1bit | 196Byte | 32Byte (256b) | 256Byte | 16Byte | 4Byte | 2Byte | 2Byte | 2Byte | 2Byte | 2Byte | 1bit |
| | [511:316] | [315:284] | [283:28] | [27:12] | [11:8] | [7:6] | [5:4] | [3:2] | [1:0] | | |

FIG. 5

| Bit [15:8] | Bit [7] | Bit [6:0] |
|---|---|---|
| reserved | Write Counter Status | Operation Result |

FIG. 6

| Start | Stuff Bytes | Key/(MAC) | Data | Nonce | Write Counter | Address | Block Count | Result | Req/Resp | CRC16 | End |
|---|---|---|---|---|---|---|---|---|---|---|---|
| 1bit | 196Byte | 32Byte (256b) | 256Byte | 16Byte | 4Byte | 2Byte | 2Byte | 2Byte | 2Byte | 2Byte | 1bit |
| | [511:316] | [315:284] | [283:28] | [27:12] | [11:8] | [7:6] | [5:4] | [3:2] | [1:0] | | |
| 0b | 0x0000... | | | 0x00 | | | | 0x00 | 0x0003 | | 1b |

FIG. 7

| Start | Stuff Bytes | Key/(MAC) | Data | Nonce | Write Counter | Address | Block Count | Result | Req/Resp | CRC16 | End |
|---|---|---|---|---|---|---|---|---|---|---|---|
| 1bit | 196Byte | 32Byte (256b) | 256Byte | 16Byte | 4Byte | 2Byte | 2Byte | 2Byte | 2Byte | 2Byte | 1bit |
| | [511:316] | [315:284] | [283:28] | [27:12] | [11:8] | [7:6] | [5:4] | [3:2] | [1:0] | | |
| 0b | 0x0000... | 0x00 | 0x00 | 0x00 | 0x00 | 0x00 | 0x00 | 0x00 | 0x0005 | | 1b |

FIG. 8

| Start | Stuff Bytes | Key/(MAC) | Data | Nonce | Write Counter | Address | Block Count | Result | Req/Resp | CRC16 | End |
|---|---|---|---|---|---|---|---|---|---|---|---|
| 1bit | 196Byte | 32Byte (256b) | 256Byte | 16Byte | 4Byte | 2Byte | 2Byte | 2Byte | 2Byte | 2Byte | 1bit |
| | [511:316] | [315:284] | [283:28] | [27:12] | [11:8] | [7:6] | [5:4] | [3:2] | [1:0] | | |
| 0b | 0x0000... | | 0x00 | 0x00 | | | 0x00 | | 0x0300 | | 1b |

| CMD INDEX | Type | Argument |
|---|---|---|
| CMD23 (default) | ac | [31] Reliable Write Request [30] '0' non-packed<br>[29] Result Read Request<br>[28:25] context ID<br>[24]: forced programming<br>[23:16] set to 0<br>[15:0] number of blocks |

MEMORY CONTROLLER FOR RPMB-INCLUSIVE MEMORY DEVICE, OPERATING METHOD THEREOF AND ELECTRONIC DEVICE INCLUDING THE SAME

CROSS-REFERENCE TO RELATED APPLICATION

This application is a continuation of U.S. patent application Ser. No. 18/587,293 filed on Feb. 26, 2024, which is a continuation of U.S. patent application Ser. No. 18/083,572 filed on Dec. 19, 2022 and issued as U.S. Pat. No. 11,914,526 on Feb. 27, 2024, which is a continuation of U.S. patent application Ser. No. 16/889,377 filed on Jun. 1, 2020 and issued as U.S. Pat. No. 11,580,033 on Feb. 14, 2023. The '377 application is a continuation of U.S. patent application Ser. No. 16/114,688 filed on Aug. 28, 2018 and issued as U.S. Pat. No. 10,671,544 on Jun. 2, 2020, which claims benefits of priority of Korean Patent Application No. 10-2018-0012287 filed on Jan. 31, 2018. The disclosure of each of the foregoing applications is incorporated herein by reference in its entirety.

BACKGROUND

1. Field of Invention

Various embodiments of the present disclosure generally relate to an electronic device. Particularly, the embodiments relate to a storage device and a method of operating the storage device.

2. Description of Related Art

A storage device stores data under the control of a host device, such as a computer, a smartphone, or a tablet. The storage device may include a memory device in which data is stored and a memory controller which controls the memory device. A memory device may be a volatile memory device or a nonvolatile memory device.

In a volatile memory device, data stored therein is lost when power supply is interrupted. Examples of the volatile memory device include a static Random Access Memory (SRAM), a dynamic RAM (DRAM), and a synchronous DRAM (SDRAM).

In a nonvolatile memory device, data stored therein is retained even when power supply is interrupted. Examples of the nonvolatile memory device include a read only memory (ROM), a programmable ROM (PROM), an electrically programmable ROM (EPROM), an electrically erasable programmable ROM (EEPROM), a flash memory, a phase-change RAM (PRAM), a magnetic RAM (MRAM), a resistive RAM (RRAM), and a ferroelectric RAM (FRAM).

SUMMARY

Various embodiments of the present disclosure are directed to a storage device having improved operating speed, and a method of operating the storage device.

An embodiment of the present disclosure may provide for a method of operating a storage device including a replay protected memory block (RPMB). The method may include receiving a write request for the RPMB from an external host, selectively storing data in the RPMB based on an authentication operation, receiving a read request from the external host, and providing result data to the external host in response to the read request, wherein the read request includes a message indicating that a read command to be subsequently received from the external host is a command related to the result data.

An embodiment of the present disclosure may provide for a storage device. The storage device may include a memory device including a replay protected memory block (RPMB), and a memory controller configured to control the memory device, wherein the memory controller may include an RPMB engine configured to receive a write request for the RPMB from an external host, selectively store data in the RPMB based on an authentication operation, and provide result data for the write request to the external host in response to a read request received from the external host, and wherein the read request may include a message indicating a read command to be subsequently received from the external host is a command related to the result data.

An embodiment of the present disclosure may provide for a memory system. The memory system may include a memory device including a replay protected memory block (RPMB), data stored or to be stored that is protected by a hash algorithm; and a controller configured to: control the memory device to access the RPMB in response to an authenticated access request; and provide a result of the access to the RPMB in response to an authenticated report request, wherein the report request includes a block count set command defined by a RPMB operation specification, and wherein the block count command has a bit representing a request for the result.

BRIEF DESCRIPTION OF THE DRAWINGS

FIG. 4 is a diagram illustrating the structure of a data packet used for a write or read request and response for an RPMB according to an embodiment of the present disclosure.

FIG. 5 is a diagram illustrating a data structure indicating operation results for an RPMB according to an embodiment of the present disclosure.

FIG. 6 is a diagram illustrating a data packet transmitted at step S303 of FIG. 3.

FIG. 7 is a diagram illustrating a data packet transmitted at step S306 of FIG. 3.

FIG. 8 is a diagram illustrating a data packet transmitted at step S309 of FIG. 3.

DETAILED DESCRIPTION

Figure 1:
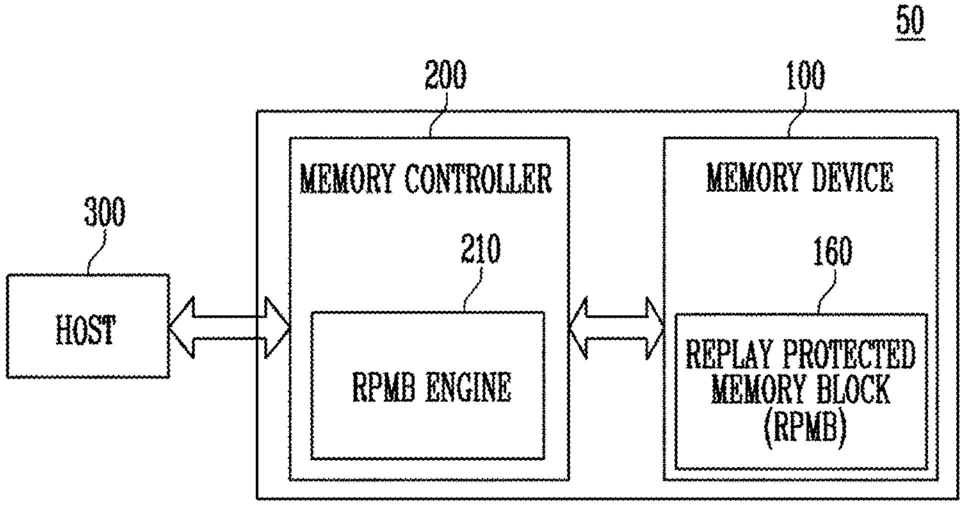
FIG. 1 is a diagram illustrating a storage device according to an embodiment of the present disclosure.

Various embodiments will now be described more fully with reference to the accompanying drawings; however, elements and features of the present disclosure may be configured or arranged differently than shown and described herein. Thus, the present invention is not limited to the embodiments set forth herein. Rather, these embodiments are provided so that this disclosure is thorough and complete and fully conveys the scope of the embodiments to those skilled in the art. It is also noted that, throughout the specification, reference to "an embodiment" or the like is not necessarily to only one embodiment, and different references to "an embodiment" or the like are not necessarily to the same embodiment(s).

In the drawings, dimensions may be exaggerated for clarity. It will be understood that when an element is referred to as being "between" two elements, it can be the only element between the two elements, or one or more intervening elements may also be present.

Embodiments will be described with reference to the accompanying drawings. Embodiments are described with reference to sectional and schematic illustrations of components and intermediate structures. As such, variations from the shapes of the illustrations as a result, for example, of manufacturing techniques and/or tolerances, are to be expected. Thus, embodiments should not be construed as limited to the particular shapes of components, structures, or their regions illustrated herein. Rather, embodiments may include deviations in shapes that result, for example, from manufacturing. In the drawings, lengths and sizes of layers and regions may be exaggerated for clarity. Like reference numerals in the drawings denote like elements.

Terms such as "first" and "second" may be used to identify various components, but they should not limit the various components. Those terms are only used for the purpose of differentiating a component from other components that otherwise have the same or similar names. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural form and vice versa, unless the context indicates otherwise. Furthermore, "include/comprise" or "including/comprising" used in the specification represents that one or more stated components, steps, operations, and/or elements are present but does not preclude the addition of unstated component(s), step(s), operation(s), and/or element(s).

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through one or more intermediate components. On the other hand, "directly connected/directly coupled" refers to one component directly coupling another component without an intermediate component.

FIG. 1 is a diagram illustrating a storage device according to an embodiment of the present disclosure.

Referring FIG. 1, a storage device 50 may include a memory device 100 and a memory controller 200.

The memory device 100 may store data. The memory device 100 is operated in response to the control of the memory controller 200. The memory device 100 may include a memory cell array (not illustrated) including a plurality of memory cells which store data. In an embodiment, examples of the memory device 100 may include a double data rate synchronous dynamic random access memory (DDR SDRAM), a low power DDR SDRAM fourth generation (LPDDR4 SDRAM), a graphics double data rate (GDDR) SDRAM, a low power DDR (LPDDR) SDRAM, a Rambus DRAM (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM).

The memory device 100 may receive a command and an address from the memory controller 200, and access a region, selected in response to the address, in the memory area 101. That is, the memory device 100 may perform an operation corresponding to the command on the region selected in response to the address. For example, the memory device 100 may perform a program operation, a read operation, and an erase operation. During a program operation, the memory device 100 may program data in the region selected in response to the address. During a read operation, the memory device 100 may read data from the region selected in response to the address. During an erase operation, the memory device 100 may erase data stored in the region selected in response to the address.

In an embodiment, the program operation and the read operation may be performed on a page basis, and the erase operation may be performed on a block basis.

In accordance with an embodiment of the present disclosure, the memory device 100 may include a replay protected memory block (RPMB) 160.

The replay protected memory block (RPMB) 160 may be an area in the memory device 100. The memory device 100 may be divided or partitioned into a plurality of areas. In an embodiment, the memory device 100 may include a boot area, a data area, and an RPMB area.

The RPMB area may include one or more RPMBs 160. Access to the RPMB area is limited, that is, authenticated access to the RPMB area is required to protect against attempted unauthorized access such as replay attacks. The RPMB area may be accessed in response to select commands such as an authenticated command. Data stored in the RPMB area may be important or secret to a user, and thus may require a high degree of security.

The data stored in the RPMB 160 may be protected from replay attacks. Through a replay attack, valid data transmitted between a host 300 and the memory device 100 is intercepted by an attacker, and the intercepted data is then recorded and played back later.

The memory controller 200 may control the overall operation of the memory device 100. The memory controller 200 may control the operation of the memory device 100 in response to a request received from a host 300 or regardless of the request received from the host 300.

For example, the memory controller 200 may control the memory device 100 so that a program operation, a read operation, or an erase operation is performed in response to the request received from the host 300. During a program operation, the memory controller 200 may provide a program command, an address, and data to the memory device 100. During a read operation, the memory controller 200 may provide a read command and an address to the memory device 100. During an erase operation, the memory controller 200 may provide an erase command and an address to the memory device 100.

In an embodiment, the memory controller 200 may autonomously generate a program command, an address, and data without receiving a request from the host, and transmit them to the memory device 100. For example, the memory controller 200 may provide commands, addresses, and data to the memory device 100 to perform background operations, such as a program operation for wear leveling and a program operation for garbage collection.

The memory controller 200 may run firmware (FW) for controlling the memory device 100. When the memory device 100 is a flash memory device, the memory controller 200 may operate firmware such as a Flash Translation Layer (FTL) for controlling communication between the host 300 and the memory device 100. More specifically, the memory controller 200 may translate a logical address in a request received from the host 300 into a physical address, which is an address ADD to be provided to the memory device 100.

In an embodiment, the memory controller 200 may include a RPMB engine 210 for the host 300 to access the RPMB 160.

The RPMB engine 210 may control a read operation and a write operation on the RPMB 160 using an authentication key. In an embodiment, the authentication key may allow a read operation and a write operation on the RPMB 160 using a message authentication code (MAC). The authentication key may be programmed in advance in a secure environment. The authentication key may be stored in the RPMB 160.

In an embodiment, the RPMB engine 210 may use a security scheme such as a hash algorithm. According to the hash algorithm, both of an authentication key and data stored or to be stored in the RPMB area may be used to calculate a MAC. For example, the host 300 may calculate the MAC using the hash algorithm from the authentication key and the data to be stored in the RPMB area, and may provide the calculated MAC and the data to the storage device 50.

The RPMB engine 210 may calculate the MAC using the hash algorithm from the provided data and the authentication key stored in the RPMB 160, and may compare the calculated MAC with the MAC received from the host 300. When the calculated MAC matches the MAC received from the host 300, the RPMB engine 210 may determine that the data received from the host 300 is not compromised.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
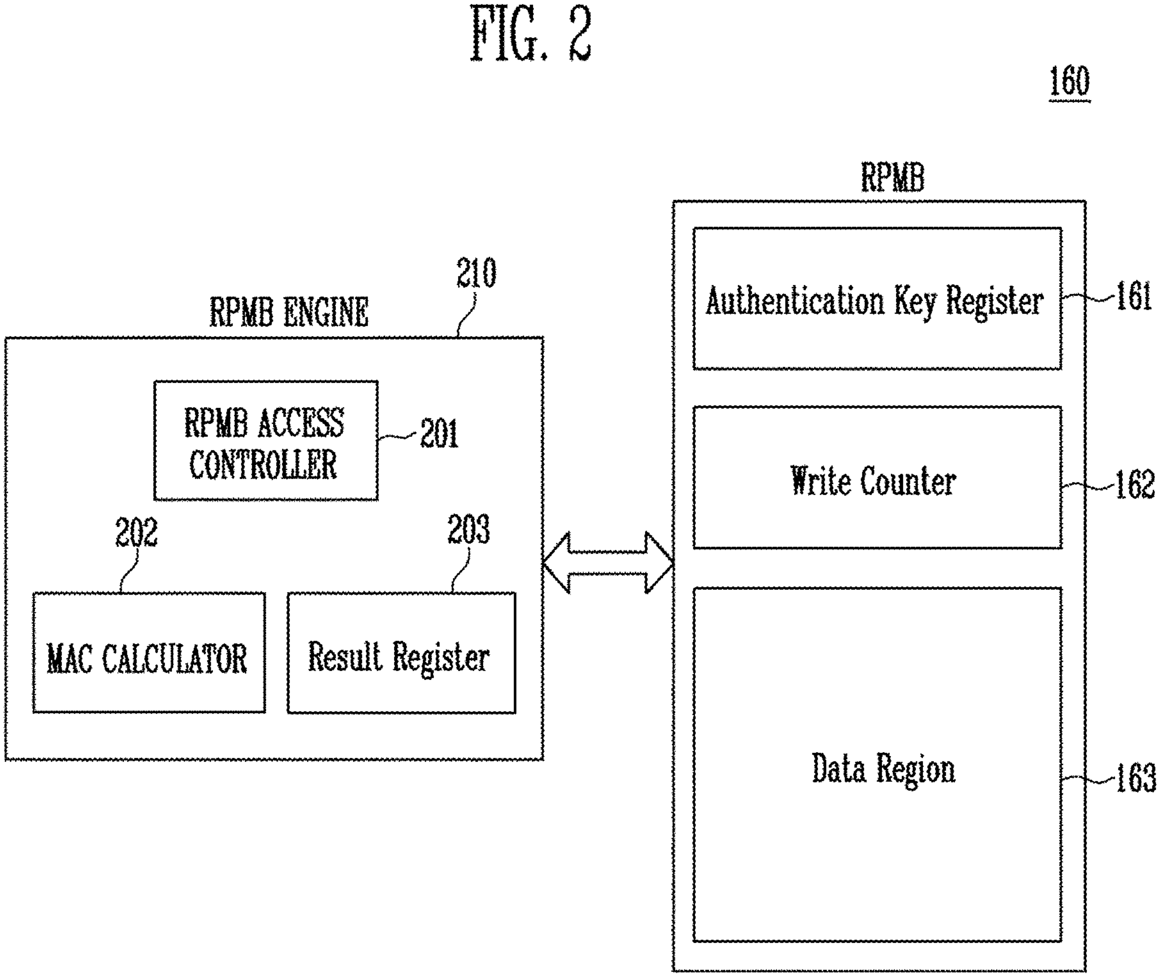
FIG. 2 is a diagram illustrating the configuration of a replay protected memory block (RPMB) engine and an RPMB of FIG. 1.

FIG. 2 is a diagram illustrating the configuration of the RPMB engine 210 and the RPMB 160 of FIG. 1.

Referring to FIG. 2, the RPMB 160 may include an authentication key register 161, a write counter 162, and a data region 163.

The authentication key register 161 may store an authentication key. In an embodiment, the authentication key register 161 may be a one-time programmable (OTP) register. The authentication key register 161 is neither overwritten nor erased. The authentication key stored in the authentication key register 161 may be used when a MAC calculator 202 of the RPMB engine 210 calculates a MAC for data requested by the host 300. In an embodiment, the authentication key may have a length of 32 bytes.

The write counter 162 may store a counter value indicating the number of authenticated data write requests and authenticated device configuration write requests. The write counter 162 may have a length of 4 bytes. An initial counter value may be 0x0000 0000. The counter value cannot be reset, and may not be increased further when the counter value reaches a maximum value of 0xFFFF FFFF. In an embodiment, when the value of the write counter 162 reaches the maximum value, a specific bit of a result register 203 may be permanently set.

The data region 163 may store pieces of data, each having a unit of 128 Kilobytes. The data region 163 of the RPMB 160 may be read or written only through authenticated access.

The RPMB engine 210 may include an RPMB access controller 201, the MAC calculator 202, and the result register 203.

The RPMB access controller 201 may control the processing of read and write requests for the RPMB 160, received from the host 300. The RPMB access controller 210 may receive read and write requests for the RPMB 160 from the host 300, and may store the results of processing of such read and write requests in the result register 203. The RPMB access controller 201 may output values stored in the result register 203 as a response to the read and write requests for the RPMB 160 from the host 300.

The MAC calculator 202 may calculate a MAC for the read or write request for the RPMB 160, which is inputted from the host 300. In an embodiment, the MAC calculator 202 may calculate the MAC using a hash algorithm. For example, the MAC calculator 202 may calculate the MAC using a hash-based message authentication code (HMAC) secure hash algorithm (SHA)-256.

The result register 203 may store the result of each access request for the RPMB 160 from the host 300. The result data stored in the result register 203 will be described in detail later with reference to FIG. 5.

Figure 3:
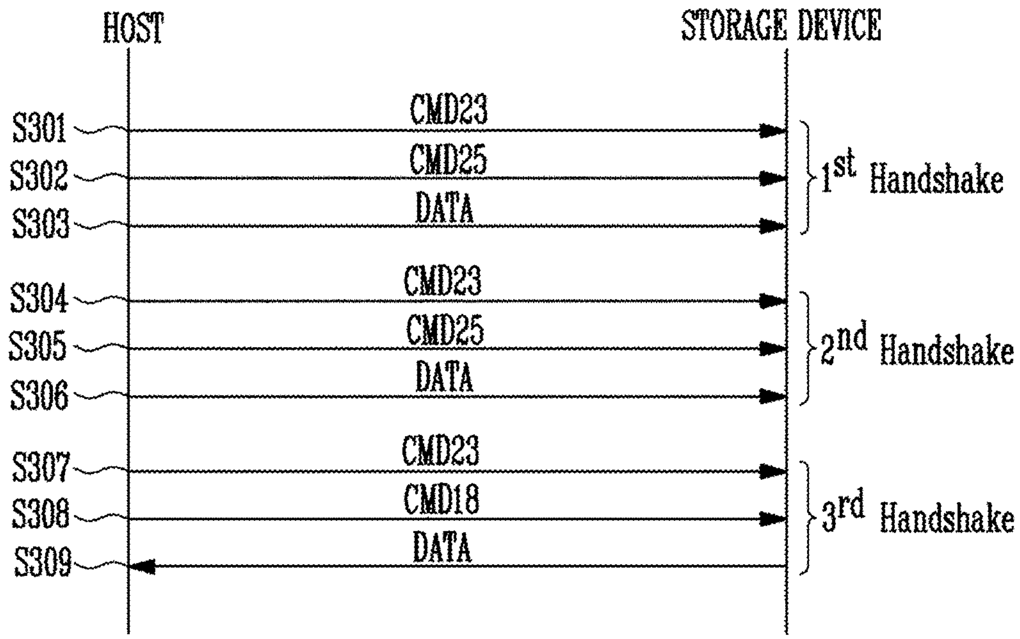
FIG. 3 is a diagram for explaining a flow in which a host performs the operation of writing data to the RPMB of the storage device according to an embodiment of the present disclosure.

FIG. 3 is a diagram for explaining a flow in which a host 300 performs the operation of writing data to the RPMB of the storage device 50.

Referring to FIG. 3, at step S301, the host 300 may transmit a block count set command CMD23 to the storage device 50. A block count may be the number of data units, e.g., blocks, to be stored in the RPMB 160. For example, the data unit may be a half sector having a size of 256 bytes.

At step S302, the host 300 may provide a multi-block write command CMD25.

Thereafter, at step S303, the host 300 may provide data to be stored in the RPMB 160 to the storage device 50. The storage device 50 may receive the data, and may calculate a MAC for the corresponding write request. When the calculated MAC matches a MAC included in the write request from the host 300, the storage device 50 may store the data in the RPMB 160.

In detail, when the MAC included in the write request from the host 300 matches the calculated MAC, the storage device 50 may compare a write counter value included in the write request with a write counter value stored in the write counter 162. When the write counter values are identical to each other, the write request from the host 300 may be determined to be authenticated.

A success in a data write operation on the RPMB 160 may be checked in response to additional requests from the host 300. At step S304, the host 300 may transmit a block count set command CMD23 to the storage device 5 to check whether the data write operation on the RPMB 160 has succeeded.

At step S305, the host 300 may provide a multi-block write command CMD25. Thereafter, at step S306, the host 300 may provide data indicating that the commands provided at steps S304 and S305 request the result of the write request provided at steps S301 to S303. The data provided by the host 300 at step S306 may be provided in the format of a data packet.

At step S307, the host 300 may transmit a block count set command CMD23 to the storage device 50. Thereafter, at step S308, the host 300 may provide a multi-block read command CMD18 to the storage device 50.

At step S309, the storage device 50 may provide the host 300 with result data stored in the result register 203 in the format of a data packet.

In accordance with the embodiment of FIG. 3, the write operation to the RPMB 160 requested by the host 300 may be mainly performed through three handshakes. That is, the write operation may be performed on the RPMB 160 through a first handshake for allowing the host 300 to transfer the write request for the RPMB 160 at steps S301 to S303, a second handshake for allowing the host 300 to transfer data indicating that a read request to be subsequently transmitted is a read request for the result register 203 at steps S304 to S306, and a third handshake for allowing the host 300 to request read data and allowing the storage device 50 to provide a value in the result register 203 in response to the read request at steps S307 to S309.

FIG. 4 is a diagram illustrating the structure of a data packet used for a write or read request to the RPMB 160 and response from the storage device 50.

FIG. 6 is a diagram illustrating a data packet transmitted at step S303 of FIG. 3.

FIG. 7 is a diagram illustrating a data packet transmitted at step S306 of FIG. 3.

FIG. 8 is a diagram illustrating a data packet transmitted at step S309 of FIG. 3.

An RPMB data packet described in FIG. 4 may be data included in a request received from the host 300 or in a response received from the storage device 50.

Referring to FIG. 4, a REQ/RESP field defines whether the corresponding data packet is a request provided from the host 300 to the storage device 50 or a response provided from the storage device 50 to the host 300. That is, a value in the REQ/RESP field may determine the type of message including the corresponding data packet. In an embodiment, the REQ/RESP field may have a length of 2 bytes.

The following Table 1 shows the types of messages depending on the values of the REQ/RESP field included in the RPMB data packet.

TABLE 1

| Request Message Types | |
|---|---|
| 0 × 0001 | Authentication key programming request |
| 0 × 0002 | Reading of the Write Counter value request |
| 0 × 0003 | Authenticated data write request |
| 0 × 0004 | Authenticated data read request |
| 0 × 0005 | Result read request |
| 0 × 0006 | Authenticated Device Configuration write request |
| 0 × 0007 | Authenticated Device Configuration read request |
| **Response Message Types** | |
| 0 × 0100 | Authentication key programming response |
| 0 × 0200 | Reading of the Write Counter value response |
| 0 × 0300 | Authenticated data write response |
| 0 × 0400 | Authenticated data read response |
| 0 × 0500 | Reserved |
| 0 × 0600 | Authenticated Device Configuration write response |
| 0 × 0700 | Authenticated Device Configuration read response |

Referring to Table 1 and FIG. 6, the value of the REQ/RESP field included in the data packet of the data provided at step S303 described with reference to FIG. 3 is 0x0003.

Referring to Table 1 and FIG. 7, the value of the REQ/RESP field included in the data packet of the data provided at step S306 described with reference to FIG. 3 is 0x0005.

Referring to Table 1 and FIG. 8, the value of the REQ/RESP field included in the data packet of the data provided at step S309 described with reference to FIG. 3 is 0x0300.

FIG. 5 is a diagram illustrating a data structure indicating operation results for the RPMB 160.

Data indicating the operation results for the RPMB 160 may have a length of 2 bytes. Bit[7] may be a bit indicating whether the value of a write counter has reached a maximum value. The value of the bit[6:0] may indicate whether the result of the operation on the RPMB 160 requested by the host 300 is success or failure.

The following Table 2 shows result data depending on the values of bit[6:0] in the data structure indicating the operation results for the RPMB 160.

TABLE 2

| Operation Results (Bit[6:0]) | |
|---|---|
| 0 × 0000 (0 × 0080) | Operation OK |
| 0 × 0001 (0 × 0081) | General failure |
| 0 × 0002 (0 × 0082) | Authentication failure (MAC comparison not matching, MAC calculation failure) |
| 0 × 0003 (0 × 0083) | Counter failure (counters not matching in comparison, counter incrementing failure) |
| 0 × 0004 (0 × 0084) | Address failure (address out of range, wrong address alignment) |
| 0 × 0005 (0 × 0085) | Write failure (data/counter/result write failure) |
| 0 × 0006 (0 × 0086) | Read failure (data/counter/result read failure) |
| 0 × 0007 | Authentication Key not yet programmed |

Referring to FIGS. 5 and 8 and Table 2, data included in the data packet of the data provided at step S309, described with reference to FIG. 3, may have the structure of data indicating the operation results for the RPMB 160 of FIG. 5. When the write request from the host 300 succeeds, the operation results bit[6:0] may indicate a value of 0x0000. When the write request from the host 300 fails, the operation results may indicate values ranging from 0x0001 to 0x0007 depending on the causes of the failure.

Figures 9, 10:
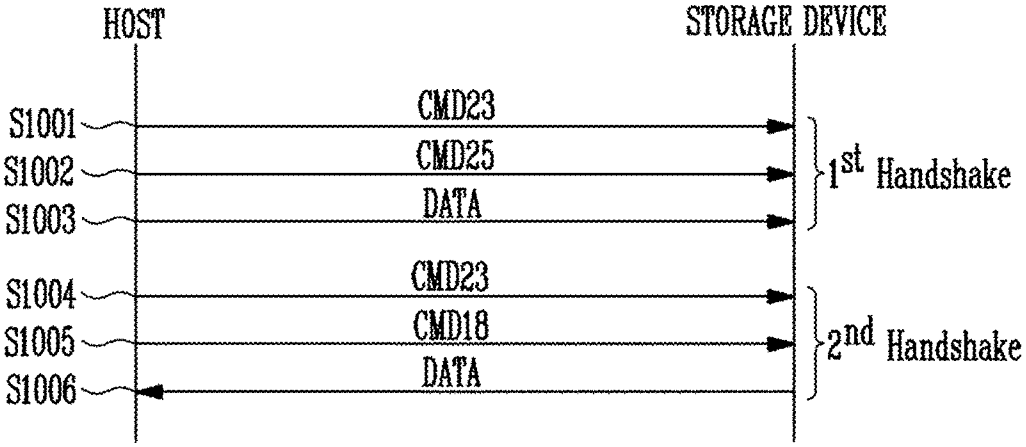
FIG. 9 is a diagram for explaining the arguments of a block count set command used for a write request for an RPMB according to an embodiment of the present disclosure.
FIG. 10 is a diagram illustrating a method of operating a storage device according to an embodiment of the present disclosure.

FIG. 9 is a diagram for explaining arguments of the block count set command CMD23 used for a write request for an RPMB 160 according to an embodiment of the present disclosure.

Among the first to third handshakes described with reference to FIG. 3, the second handshake may transmit a multi-block write command as in the case of the first handshake, but it may not be a handshake which requests a write operation on the RPMB 160. That is, the second handshake is a procedure for indicating that a multi-block read command CMD18 to be subsequently requested by the host 300 is a command for requesting result data stored in the result register 203. Therefore, even if the second handshake at steps S307 to S309 described with reference to FIG. 3 is not performed, the storage device 50 need not perform the second handshake described with reference to FIG. 3 as long as the storage device 50 can identify that the multi-block read command CMD18 to be subsequently received from the host 300 is a command for requesting result data stored in the result register 203.

Referring to FIG. 9, bit [29] of the block count set command CMD23 may be used to check the result of the write request. That is, at step S307 for the third handshake operation described with reference to FIG. 3, the host 300 may provide the storage device 50 with the block count set command CMD23 indicating that the multi-block read command CMD18 to be subsequently provided to the storage device 50 is a command for requesting result data stored in the result register 203 of the storage device 50.

FIG. 10 is a diagram illustrating a method of operating a storage device 50 according to an embodiment of the present disclosure.

Referring to FIG. 10, at step S1001, the host 300 may transmit a block count set command CMD23 to the storage device 50. A block count may be the number of data blocks desired to be stored in an RPMB 160 by the host 300. For example, the data unit may be a half sector having a size of 256 bytes.

At step S1002, the host 300 may provide a multi-block write command CMD25.

Next, at step S1003, the host 300 may provide data to be stored in the RPMB 160 to the storage device 50. The storage device 50 may receive the data, and may calculate a MAC for the corresponding write request. When the calculated MAC matches a MAC included in the write request from the host 300, the storage device 50 may store the data in the RPMB 160.

In detail, when the MAC included in the write request from the host 300 matches the calculated MAC, the storage device 50 may compare a write counter value included in the write request with a write counter value stored in the write counter 162. When the write counter values are identical to each other, the write request from the host 300 may be determined to be authenticated.

Whether a data write operation on the RPMB 160 is successful may be checked in response to an additional request from the host 300. At step S1004, the host 300 may transmit a block count set command CMD23 to the storage device 50 so as to check whether the data write operation on the RPMB 160 has succeeded. At step S1004, the block count set command CMD23 provided by the host 300 CMD23 may include a message indicating that a multi-block read command CMD18 to be subsequently provided is a command for requesting the result of the write request made at steps S1001 to S1003.

In accordance with an embodiment of the present invention, the host 300 may use the bit [29] of the block count set command CMD23 as a bit for checking the result of the write request. For example, the host 300 may set the bit [29] to one of an enable state and a disable state, and may then provide the block count set command CMD23 with the set bit [29] to the storage device 50. The storage device 50 may recognize that the multi-block read command CMD18 to be subsequently provided at step S1005 is a command for requesting the result data in the result register 203 through the value of the bit [29] of the block count set command CMD23 received from the host 300.

At step S1005, the host 300 may provide the multi-block read command CMD18 to the storage device 50.

At step S1006, the storage device 50 may provide the host 300 with the result data stored in the result register 203 in the format of a data packet.

In accordance with the embodiment of FIG. 10, the host 300 uses the bit [29] of the block count set command CMD23 as a bit for checking the result of the write request, and thus the host 300 may request the result of performance of the write operation on the RPMB 160 without performing the second handshake procedure (i.e., step S304 to S306) described with reference to FIG. 3.

Therefore, in accordance with the embodiment of FIG. 10, the host 300 and the storage device 50 may request the result of performance of the write operation on the RPMB 160 through two handshakes, that is, the first handshake and the second handshake, unlike the embodiment of FIG. 3. Compared to the embodiment of FIG. 3, an unnecessary handshake procedure may be omitted, and thus a faster write operation on the RPMB 160 may be performed.

Figure 11:
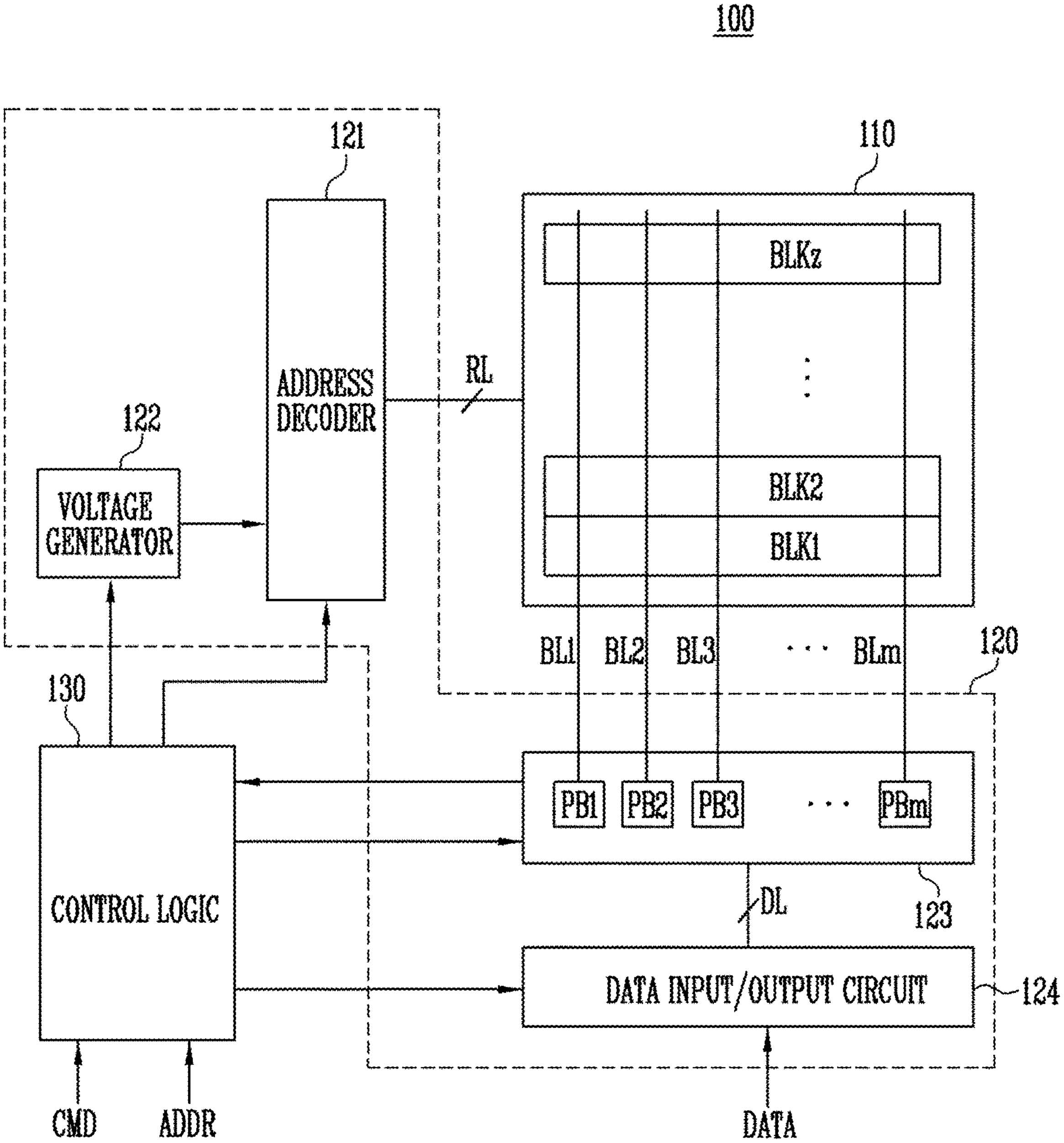
FIG. 11 is a diagram illustrating the structure of a memory device of FIG. 1.

FIG. 11 is a diagram illustrating the structure of the memory device 100 of FIG. 1.

Referring to FIG. 11, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells are nonvolatile memory cells. Memory cells coupled to the same word line are defined as a single page. That is, the memory cell array 110 is composed of a plurality of pages. In an embodiment, each of the plurality of memory blocks BLK1 to BLKz in the memory cell array 110 may include a plurality of dummy cells. One or more dummy cells may be coupled in series between a drain select transistor and the memory cells and between a source select transistor and the memory cells.

Each of the memory cells of the memory device 100 may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, the read and write circuit 123, and a data input/output circuit 124.

The peripheral circuit 120 may drive the memory cell array 110. For example, the peripheral circuit 120 may drive the memory cell array 110 so that a program operation, a read operation, and an erase operation are performed.

The address decoder 121 is coupled to the memory cell array 110 through row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 is configured to operate under the control of the control logic 130. The address decoder 121 receives the address ADDR from the control logic 130.

The address decoder 121 is configured to decode a block address of the received address ADDR. The address decoder 121 selects at least one memory block from among the memory blocks BLK1 to BLKz in response to the decoded block address. The address decoder 121 is configured to decode a row address of the received address ADDR. The address decoder 121 may select at least one word line of the selected memory block by applying voltages supplied from the voltage generator 122 to the word line(s) WL in response to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to a selected word line and apply a verification pass voltage higher than the verify voltage to unselected word lines.

During a read operation, the address decoder 121 may apply a read voltage to a selected word line and apply a read pass voltage higher than the read voltage to unselected word lines.

In an embodiment, the erase operation of the memory device 100 may be performed on a memory block basis. During an erase operation, the address ADDR input to the memory device 100 includes a block address. The address decoder 121 may decode the block address and select a single memory block in response to the decoded block address. During the erase operation, the address decoder 121 may apply a ground voltage to word lines coupled to the selected memory block.

In an embodiment, the address decoder 121 may be configured to decode a column address of the received address ADDR. A decoded column address may be transferred to the read and write circuit 123. In an embodiment, the address decoder 121 may include components such as a row decoder, a column decoder, and an address buffer.

The voltage generator 122 may generate a plurality of voltages using an external supply voltage provided to the memory device 100. The voltage generator 122 is operated under the control of the control logic 130.

In an embodiment, the voltage generator 122 may generate an internal supply voltage by regulating the external supply voltage. The internal supply voltage generated by the voltage generator 122 is used as an operating voltage of the memory device 100.

In an embodiment, the voltage generator 122 may generate a plurality of voltages using an external supply voltage or an internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage in order to generate a plurality of voltages having various voltage levels, and may generate a plurality of voltages by selectively activating the pumping capacitors under the control of the control logic 130.

The generated voltages may be supplied to the memory cell array 110 by the address decoder 121.

The read and write circuit 123 may include first to m-th page buffers PB1 to PBm, which are coupled to the memory cell array 110 through the first to m-th bit lines BL1 to BLm, respectively. The first to m-th page buffers PB1 to PBm are operated under the control of the control logic 130.

The first to m-th page buffers PB1 to PBm may perform data communication with the data input/output circuit 124. During a program operation, the first to m-th page buffers PB1 to PBm may receive data to be stored DATA through the data input/output circuit 124 and data lines DL.

During a program operation, the first to m-th page buffers PB1 to PBm may transfer the data, received through the data input/output circuit 124, to selected memory cells through the bit lines BL1 to BLm when a program pulse is applied to each selected word line. The memory cells in the selected page are programmed based on the transferred data. Memory cells coupled to a bit line to which a program permission voltage (e.g., a ground voltage) is applied may have increased threshold voltages. Threshold voltages of memory cells coupled to a bit line to which a program prohibition voltage (e.g., a supply voltage) is applied may be maintained. During a program verify operation, the first to m-th page buffers may read data, in which the threshold voltages of memory cells are stored as verify voltages, from the selected memory cells through the bit lines BL1 to BLm.

During a read operation, the read and write circuit 123 may read data from the memory cells in the selected page through the bit lines BL, and may store the read data in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) for receiving input data. During a program operation, the data input/output circuit 124 receives data to be stored DATA from an external controller (not shown). During a read operation, the data input/output circuit 124 outputs the data, received from the first to m-th page buffers PB1 to PBm included in the read and write circuit 123, to the external controller.

The control logic 130 may be coupled to the address decoder 121, the voltage generator 122, the read and write circuit 123, and the data input/output circuit 124. The control logic 130 may control the overall operation of the memory device 100. The control logic 130 may be operated in response to a command CMD received from an external device.

Figure 12:
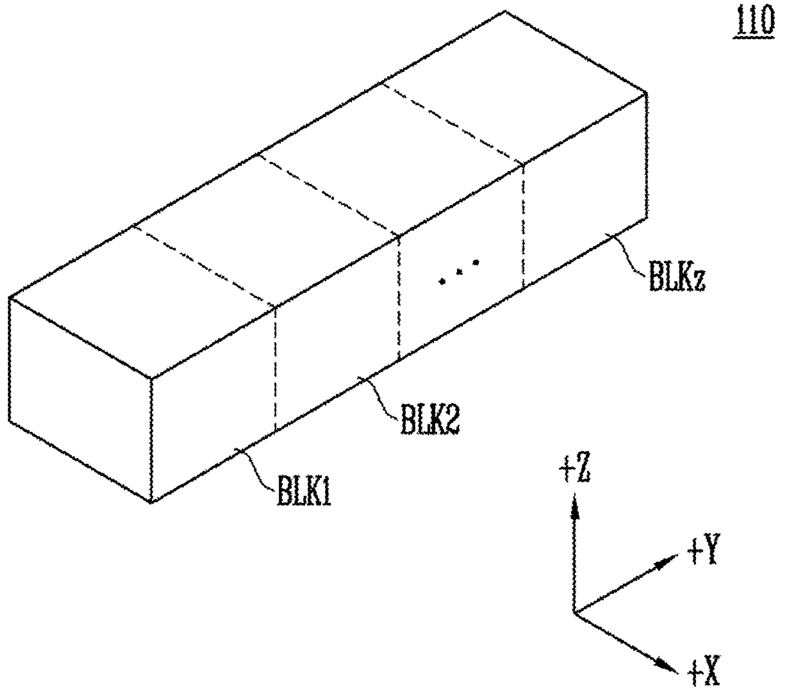
FIG. 12 is a diagram illustrating an embodiment of a memory cell array of FIG. 11.

FIG. 12 is a diagram illustrating an embodiment of the memory cell array of FIG. 11.

Referring to FIG. 12, the memory cell array 110 may include a plurality of memory blocks BLK1 to BLKz. Each memory block has a three-dimensional (3D) structure. Each memory block includes a plurality of memory cells stacked on a substrate. Such memory cells are arranged along a positive X (+X) direction, a positive Y (+Y) direction, and a positive Z (+Z) direction. The structure of each memory block will be described in detail below with reference to FIGS. 13 and 14.

Figure 13:
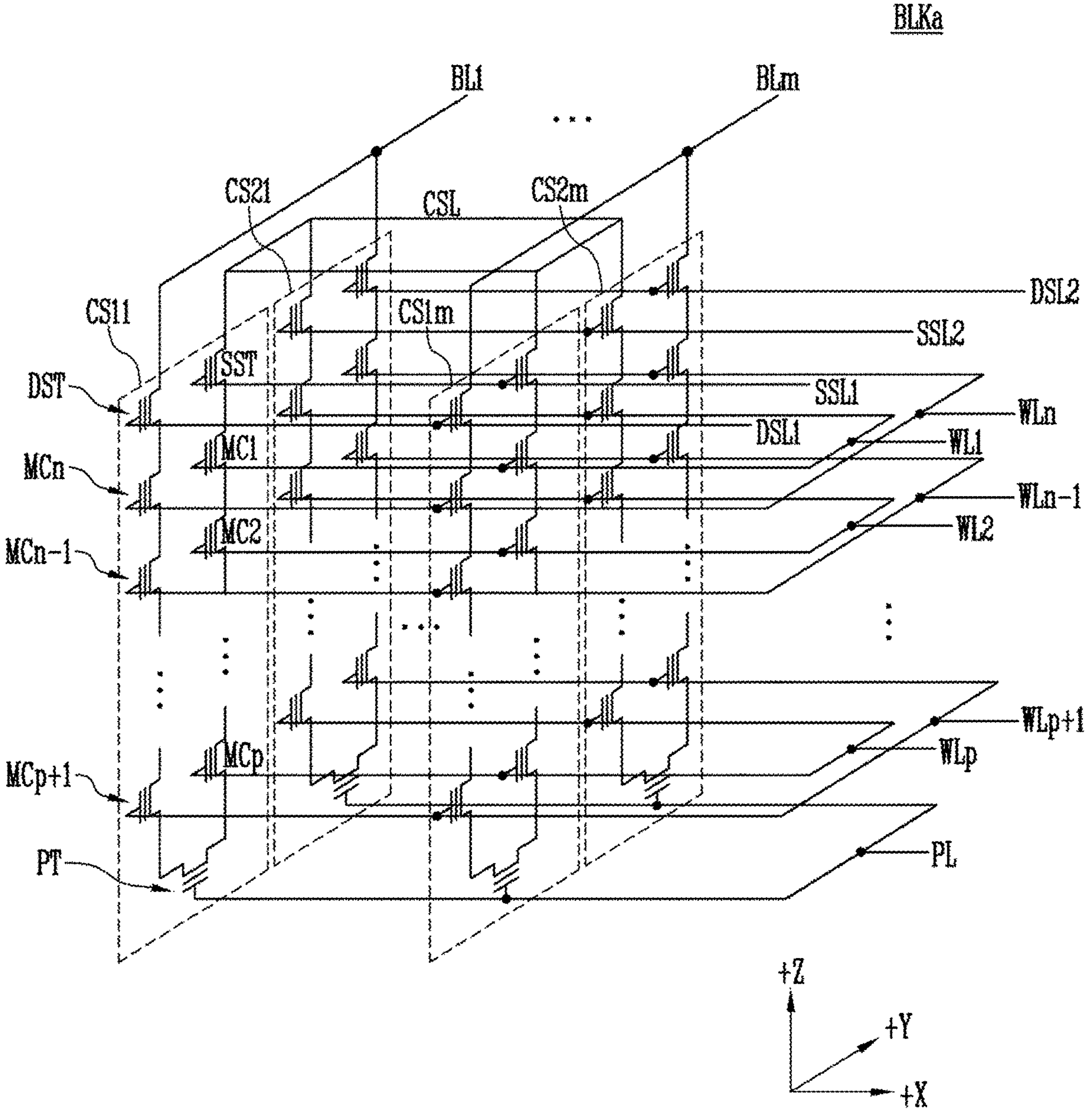
FIG. 13 is a circuit diagram illustrating an exemplary memory block BLKa of memory blocks BLK1 to BLKz of FIG. 12.

FIG. 13 is a circuit diagram illustrating an example of any one memory block BLKa of the memory blocks BLK1 to BLKz of FIG. 12.

Referring to FIG. 13, the memory block BLKa may include a plurality of cell strings CS11 to CS1*m* and CS21 to CS2*m*. In an embodiment, each of the cell strings CS11 to CS1*m* and CS21 to CS2*m* may be formed in a 'U' shape. In the memory block BLKa, m cell strings are arranged in a row direction (i.e., a positive (+) X direction). In FIG. 13, two cell strings are shown as being arranged in a column direction (i.e., a positive (+) Y direction). However, this illustration is by way of example; it will be understood that three or more cell strings may be arranged in the column direction.

Each of the plurality of cell strings CS11 to CS1*m* and CS21 to CS2*m* may include at least one source select transistor SST, first to n-th memory cells MC1 to MCn, a pipe transistor PT, and at least one drain select transistor DST.

The select transistors SST and DST have similar structures, as do the memory cells MC1 to MCn. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extended in a row direction, and source select transistors of cell strings arranged in different rows are coupled to different source select lines. In FIG. 13, source select transistors of cell strings CS11 to CS1*m* in a first row are coupled to a first source select line SSL1. The source select transistors of cell strings CS21 to CS2*m* in a second row are coupled to a second source select line SSL2.

In an embodiment, source select transistors of the cell strings CS11 to CS1*m* and CS21 to CS2*m* may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a negative (−) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

The gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extended in a row direction. Drain select transistors of cell strings CS11 to CS1*m* in the first row are coupled to a first drain select line DSL1. Drain select transistors of cell strings CS21 to CS2*m* in a second row are coupled to a second drain select line DSL2.

Cell strings arranged in a column direction are coupled to bit lines extended in a column direction. In FIG. 13, cell strings CS11 and CS21 in a first column are coupled to a first bit line BL1. Cell strings CS1*m* and CS2*m* in an m-th column are coupled to an m-th bit line BLm.

The memory cells coupled to the same word line in cell strings arranged in a row direction constitute a single page. For example, memory cells coupled to the first word line WL1, among the cell strings CS11 to CS1*m* in the first row, constitute a single page. Memory cells coupled to the first word line WL1, among the cell strings CS21 to CS2*m* in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1*m* or CS21 to CS2*m* arranged in a row direction, may be coupled to the even bit lines, respectively, and odd-numbered cell strings, among the cell strings CS11 to CS1*m* or CS21 to CS2*m* arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the dummy memory cell(s) are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

In order to efficiently control the dummy memory cell(s), each may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 14:
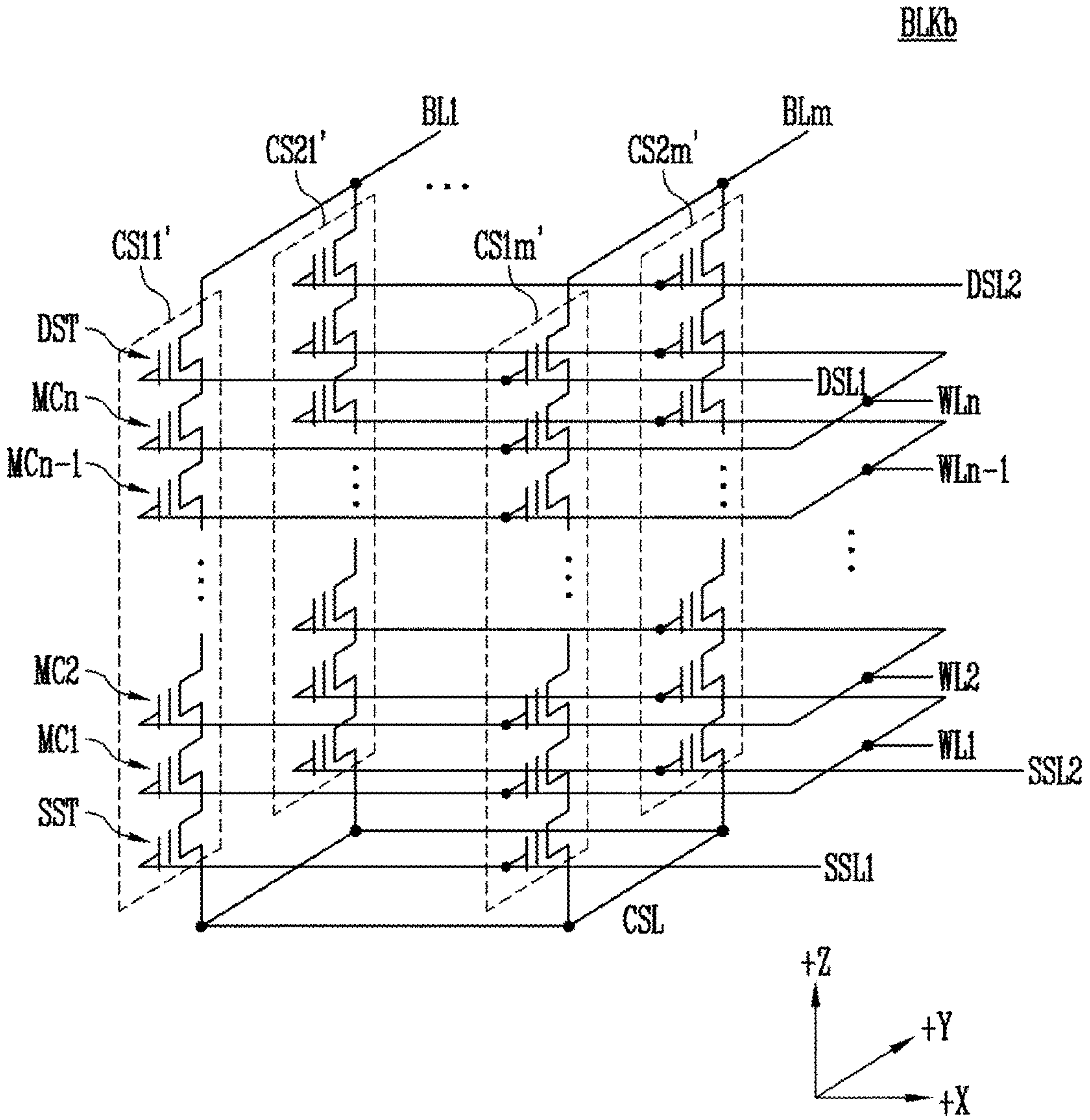
FIG. 14 is a circuit diagram illustrating an example of a memory block BLKb of the memory blocks BLK1 to BLKz of FIG. 12.

FIG. 14 is a circuit diagram illustrating an example of any one memory block BLKb of the memory blocks BLK1 to BLKz of FIG. 12.

Referring to FIG. 14, the memory block BLKb may include a plurality of cell strings CS11' to CS1*m*' and CS21' to CS2*m*'. Each of the plurality of cell strings CS11' to CS1*m*' and CS21' to CS2*m*' is extended along a positive Z (+Z) direction. Each of the cell strings CS11' to CS1*m*' and CS21' to CS2*m*' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1*m*' arranged in a first row are coupled to a first source select line SSL1. Source select transistors of cell strings CS21' to CS2*m*' arranged in a second row are coupled to a second source select line SSL2. In an embodiment, source select transistors of the cell strings CS11' to CS1*m*' and CS21' to CS2*m*' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extended in a row direction. The drain select transistors of the cell strings CS11' to CS1*m*' in the first row are coupled to a first drain select line DSL1. The drain select transistors of the cell strings CS21' to CS2*m*' in the second row are coupled to a second drain select line DSL2.

As a result, the memory block BLKb of FIG. 14 has a circuit similar to that of the memory block BLKa of FIG. 13. However, a pipe transistor PT, which is shown in FIG. 13, is excluded from each cell string in the embodiment shown in FIG. 14.

In an embodiment, even bit lines and odd bit lines, instead of first to m-th bit lines BL1 to BLm, may be provided. Further, even-numbered cell strings, among the cell strings CS11' to CS1*m*' or CS21' to CS2*m*' arranged in a row direction, may be coupled to the even bit lines, respectively, and odd-numbered cell strings, among the cell strings CS11' to CS1*m*' or CS21' to CS2*m*' arranged in the row direction, may be coupled to the odd bit lines, respectively.

In an embodiment, one or more of the first to n-th memory cells MC1 to MCn may be used as dummy memory cells. For example, the dummy memory cell(s) are provided to reduce an electric field between the source select transistor SST and the memory cells MC1 to MCn. Alternatively, the dummy memory cell(s) are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the dummy memory cell(s), each may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 15:
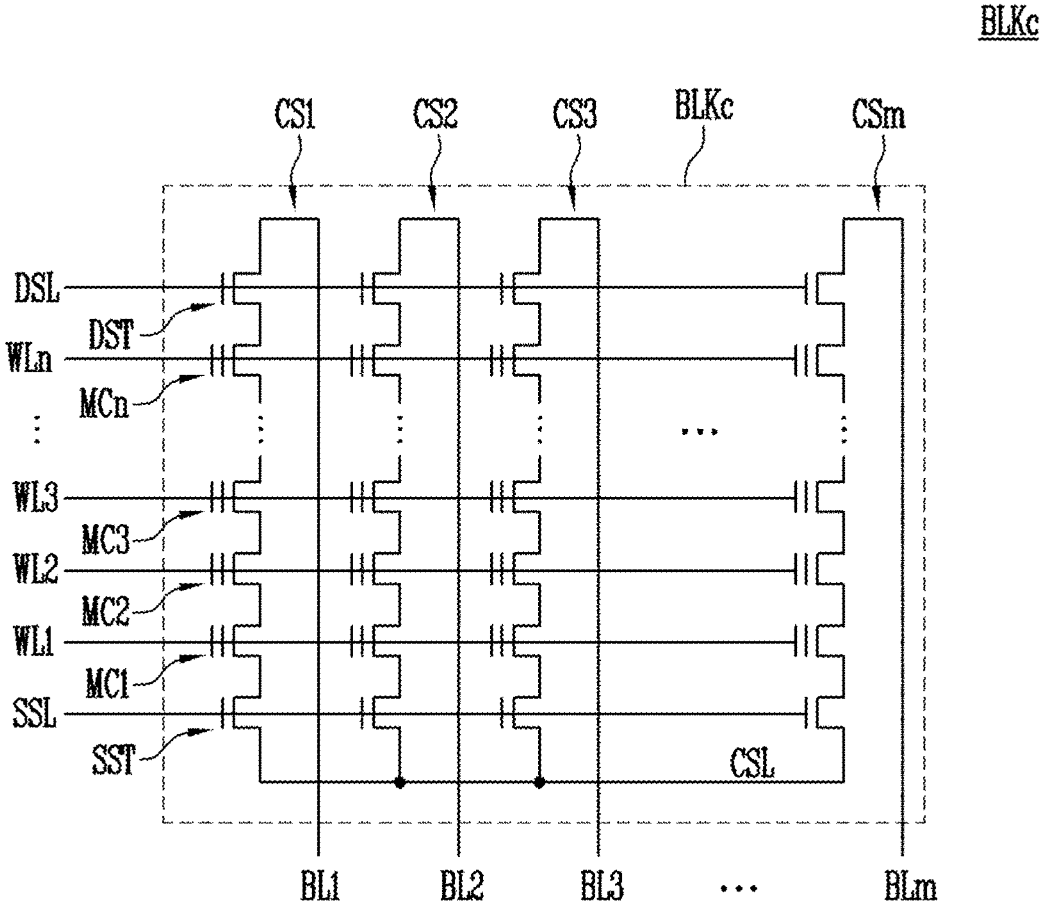
FIG. 15 is a circuit diagram illustrating an embodiment of the memory cell array of FIG. 11.

FIG. 15 is a circuit diagram showing an embodiment of the memory cell array of FIG. 11.

Referring to FIG. 15, the memory cell array may have a two-dimensional (2D) planar structure, not the 3D structure described above with reference to FIGS. 12 to 14.

In FIG. 15, a memory block BLKc includes a plurality of cell strings CS1 to CSm. The plurality of cell strings CS1 to CSm may be coupled to a plurality of bit lines BL1 to BLm, respectively. Each of the cell strings CS1 to CSm may include at least one source select transistor SST, first to n-th memory cells MC1 to MCn, and at least one drain select transistor DST.

The select transistors SST and DST and the memory cells MC1 to MCn may have similar structures. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and the memory cells MC1 to MCn.

The first to n-th memory cells MC1 to MCn in each cell string are coupled between the source select transistor SST and the drain select transistor DST.

The drain select transistor DST of each cell string is coupled between the corresponding bit line and the memory cells MC1 to MCn.

The memory cells coupled to the same word line may constitute a single page. The cell strings CS1 to CSm may be selected by selecting the drain select line DSL. One page may be selected from the selected cell strings by selecting any one of the word lines WL1 to WLn.

In other embodiments, even bit lines and odd bit lines may be provided instead of the first to m-th bit lines BL1 to BLm. Among the cell strings CS1 to CSm, even-numbered cell strings may be coupled to the even bit lines, respectively, and odd-numbered cell strings may be coupled to the odd bit lines, respectively.

Figure 16:
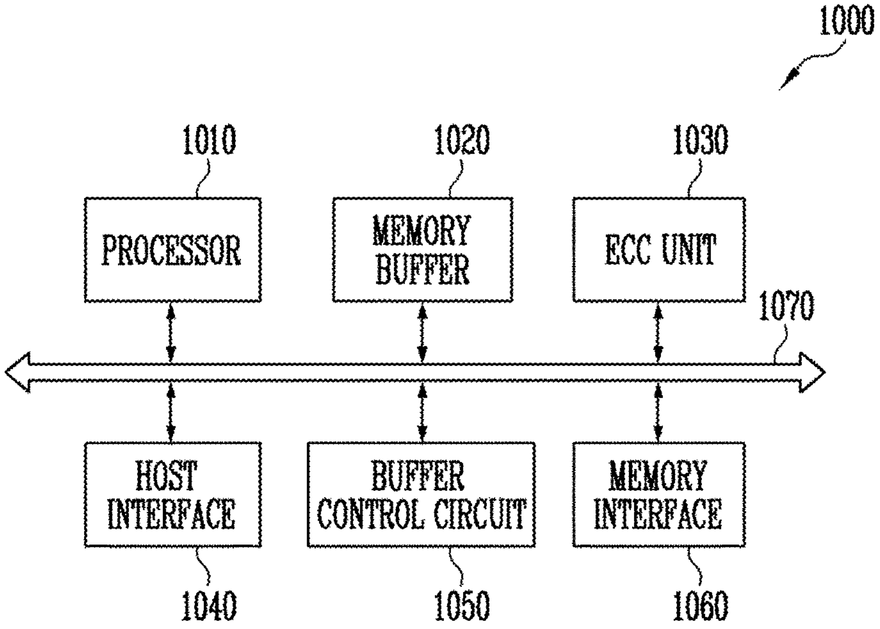
FIG. 16 is a diagram illustrating an embodiment of a memory controller of FIG. 1.

FIG. 16 is a diagram illustrating an embodiment of the memory controller of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 16, the memory controller 1000 may include a processor 1010, a memory buffer 1020, an error checking and correction (ECC) unit 1030, a host interface 1040, a buffer control circuit 1050, a memory interface 1060, and a bus 1070.

The bus 1070 may provide communication channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA in accordance with any suitable address mapping method, which may be based on a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor may derandomize data received from the memory device during a read operation. For example, the processor 1010 may derandomize the data received from the memory device using a derandomizing seed. The derandomized data may be outputted to the host.

In an embodiment, the processor 1010 may run software or firmware to perform randomizing and derandomizing operations.

In an embodiment, the processor 1010 may perform the operation of the RPMB engine 210, described above with reference to FIGS. 1 and 2.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC unit 1030 may perform error correction. The ECC unit 1030 may perform error correction code (ECC) encoding based on data to be written to the memory device through the memory interface 1060. The ECC-encoded data may be transferred to the memory device through the memory interface 1060. The ECC unit 1030 may perform ECC decoding based on data received from the memory device through the memory interface 1060. In an example, the ECC unit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050. One or both of the memory buffer 1020 and the buffer control circuit 1050 may be provided separately, or their functions consolidated in one or more suitable components.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, such that neither interferes with nor influences the other. The data bus may be coupled to the host interface 1040, the buffer control circuit 1050, the ECC unit 1030, and the memory interface 1060. The control bus may be coupled to the host interface 1040, the processor 1010, the buffer control circuit 1050, the memory buffer 1020, and the memory interface 1060.

Figure 17:
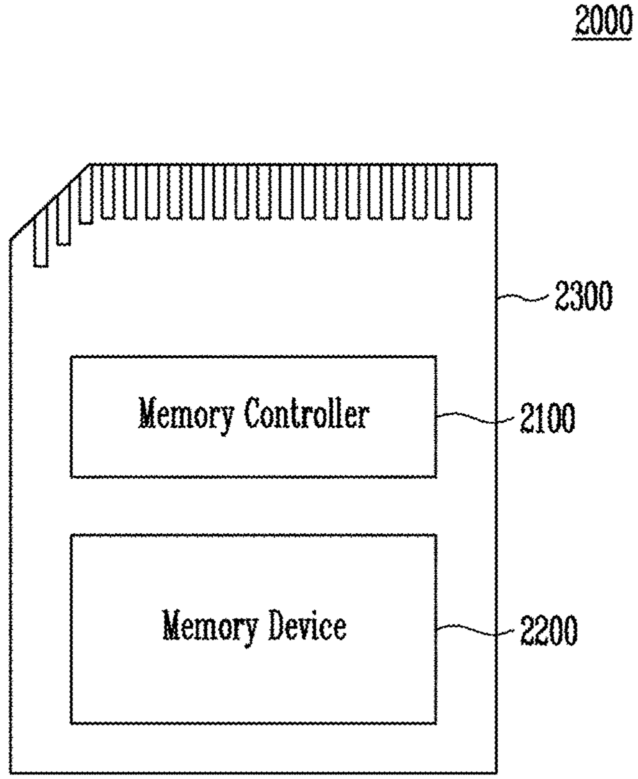
FIG. 17 is a block diagram illustrating a memory card system to which the storage device according to an embodiment of the present disclosure is applied.

FIG. 17 is a block diagram illustrating a memory card system to which the storage device according to an embodiment of the present disclosure is applied.

Referring to FIG. 17, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200, described above with reference to FIG. 1.

In an embodiment, the memory controller 2100 may include components, such as a RAM, a processor, a host interface, a memory interface, and an ECC unit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The operation of an RPMB engine 210, described above with reference to FIGS. 1 and 2, may be performed by the memory controller 2100.

In an embodiment, the memory controller 2100 or the memory device 2200 may be packaged as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like, and may be provided as a single semiconductor package. Alternatively, the memory device 2200 may include a plurality of nonvolatile memory chips, which may be packaged as any of the above-described package types and may be provided as a single semiconductor package.

In an embodiment, the memory controller 2100 and the memory device 2200 may be integrated into a single semiconductor device. In an embodiment, the memory controller 2100 and the memory device 2200 may be so integrated to form a solid state drive (SSD). In another embodiment, the memory controller 2100 and the memory device 2200 may be so integrated to form a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

In an embodiment, the memory device 2200 may be the memory device 100, described above with reference to FIGS. 1 and 11.

Figure 18:
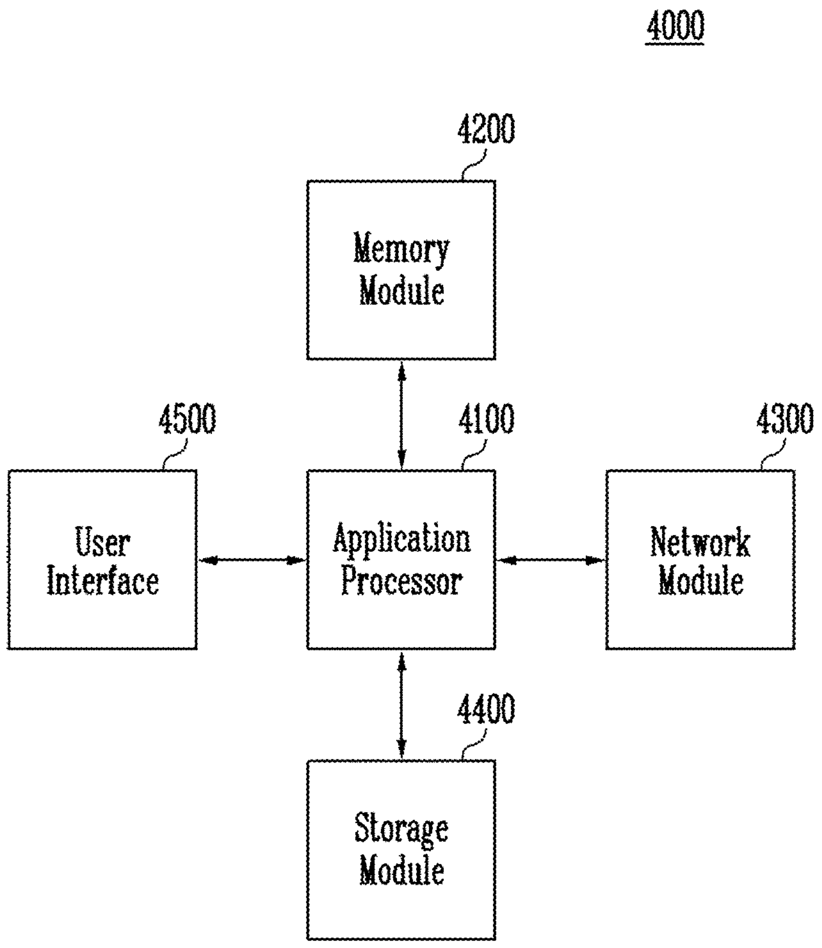
FIG. 18 is a block diagram illustrating a user system to which the storage device according to an embodiment of the present disclosure is applied.

FIG. 18 is a block diagram illustrating a user system to which the storage device according to an embodiment of the present disclosure is applied.

Referring to FIG. 18, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, and the like for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, and each of the plurality of nonvolatile memory devices may be the memory device 100, described above with reference to FIGS. 1 and 11. Further, the storage module 4400 may be the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and/or a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

Thus, embodiments of the present disclosure provide a storage device having improved operating speed and a method of operating the storage device.

While embodiments of the present disclosure have been disclosed for illustrative purposes, those skilled in the art will appreciate, in light of the foregoing description, that various modifications, additions and substitutions are possible, without departing from the spirit and scope of the present disclosure. Therefore, the scope of the present disclosure is not limited by the above-described embodiments but rather defined by the accompanying claims and equivalents thereof.

In the above-discussed embodiments, all steps may be selectively performed or skipped. In addition, the steps in each embodiment may not always be performed in regular order. Furthermore, the embodiments disclosed in the present specification and the drawings aim to help those skilled in this art more clearly understand the present disclosure rather than aiming to limit the bounds of the present disclosure. In other words, one skilled in the art to which the present disclosure pertains will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the accompanying claims and equivalents thereof.

What is claimed is:

1. A chip package, comprising:

a volatile memory device; and a storage device having a replay protected memory block (RPMB) requiring authenticated access, wherein the volatile memory device stores a first data packet for the RPMB and data corresponding to the first data packet, and wherein the storage device receives the first data packet and the data corresponding to the first data packet, to perform authentication operation based on the first data packet, to generate a second data packet including information indicating that a response type of the second data packet is a write response.

2. The chip package of claim 1, wherein a host device receives the first data packet and the data corresponding to the first data packet from the volatile memory device, and wherein the host device provides the storage device with the first data packet and the data corresponding to the first data packet, and wherein the storage device provides the host device with the second data packet.

3. The chip package of claim 2, wherein the first data packet includes block count information and write counter information.

4. The chip package of claim 2, wherein the second data packet includes result information for a write operation in response to the first data packet.

5. The chip package of claim 3, wherein the first data packet includes address information of the data for storing and information regarding a request type of the first data packet indicating the request type of the first data packet is a write request.

6. The chip package of claim 4, wherein the result information is included in a predetermined field of the second data packet.

7. The chip package of claim 2, wherein the storage device comprises:

a memory device configured to include the replay protected memory block (RPMB); and a memory controller configured to receives the first data packet and the data corresponding to the first data packet, to perform the authentication operation based on the first data packet, to generate the second data packet, and to provide the second data packet to the host device.

8. The chip package of claim 7, wherein the memory controller comprises a result register configured to store the result information.

9. The chip package of claim 2, wherein the RPMB is an area, accessed by an authentication key, in a memory area of the storage device.

10. The chip package of claim 1, wherein the volatile memory device is configured to function as at least one of a main memory, a working memory, a buffer memory or a cache memory.

11. The chip package of claim 1, wherein the RPMB includes nonvolatile memory cells.

12. The chip package of claim 1, wherein the volatile memory device is formed in a first chip, and the storage device is formed in a second chip other than the first chip.

* * * * *